United States Patent [19]

Mart

[11] 4,303,060

[45] Dec. 1, 1981

[54] COLLECTOR PANEL FOR SOLAR HEATING SYSTEM

[75] Inventor: Kenneth D. Mart, Naples, Fla.

[73] Assignee: Walker & Mart Solar Laboratories, Inc., Naples, Fla.

[21] Appl. No.: 105,647

[22] Filed: Dec. 20, 1979

[51] Int. Cl.³ .................................. F24J 3/02; F28F 3/14
[52] U.S. Cl. .................................. 126/445; 126/448; 165/170
[58] Field of Search ............. 126/444, 445, 447, 448, 126/449; 165/170, 171, 172, 173, 174, 175

[56] References Cited

U.S. PATENT DOCUMENTS

| | | | |
|---|---|---|---|
| 2,358,476 | 9/1944 | Routh et al. | 165/170 |
| 4,066,121 | 1/1978 | Kleine et al. | 126/444 |
| 4,081,026 | 3/1978 | Kleine et al. | 165/170 |
| 4,099,559 | 7/1978 | Butt | 126/444 |
| 4,109,711 | 8/1978 | Kleine et al. | 126/444 |
| 4,120,351 | 10/1978 | Kleine et al. | 126/444 |
| 4,122,828 | 10/1978 | Diperi | 165/170 |
| 4,184,543 | 1/1980 | Kleine et al. | 165/170 |
| 4,210,127 | 7/1980 | Kleine et al. | 126/448 |
| 4,235,287 | 11/1980 | Kleine et al. | 126/445 |
| 4,257,398 | 3/1981 | Watson | 126/448 |

*Primary Examiner*—Daniel J. O'Connor
*Attorney, Agent, or Firm*—Scrivener, Clarke, Scrivener and Johnson

[57] ABSTRACT

The disclosure is of a metal panel forming part of a solar heating system, having interconnected longitudinal and transverse passages through which the heat exchange fluid flows.

4 Claims, 6 Drawing Figures

COLLECTOR PANEL FOR SOLAR HEATING SYSTEM

SUMMARY OF THE INVENTION

The solar heating panel provided by the invention has two spaced parallel elongated header tubes for the inlet and outlet of the heat exchange medium, the headers being interconnected by a network of longitudinal and transverse tubes of differing internal sizes arranged to produce an irregular flow pattern whereby a constant low pressure of the moving heat exchange medium results.

DESCRIPTION OF THE INVENTION

The solar heating panel, or collector plate, provided by the invention comprises a sheet metal plate of desired size and configuration having formed therein a network or grid of closed interconnecting passages or tubes. The panel is preferably formed by the Roll-Bond process which is described and claimed in U.S. Pat. Nos. 2,690,002, 3,053,514, 3,463,676 and perhaps others. The method of manufacture of the panel forms no part of the present invention and will not be further described in this specification. It will be understood, however, that the solar panel as used in accordance with the invention is preferably formed of copper but may be formed of aluminum or other metal and has a black chrome coating.

The preferred embodiment of the invention disclosed in this specification comprises an elongated rectangular plate A having a network of closed conduits formed therein the configuration and internal sizes of which produce a constant low pressure flow of heat absorbing fluid medium resulting in a high efficiency which has been found to be in the range of 70% to 80%.

Figure 1:
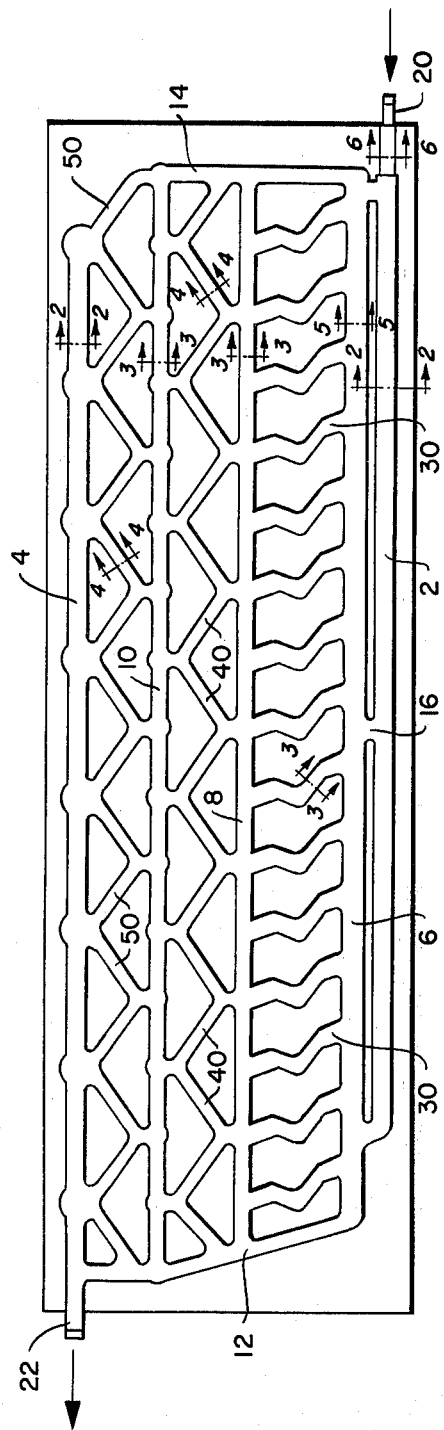
FIG. 1 is an elevational view of the panel.
Figure 6:
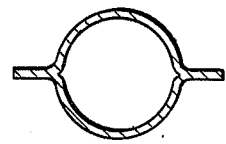
FIGS. 2, 3, 4, 5 and 6 are, respectively, cross sectional views taken on lines 2—2, 3—3, 4—4, 5—5 and 6—6 of FIG. 1.
Figure 5:
Figure 3:
Figure 2:
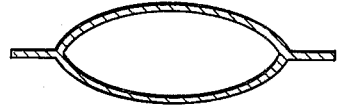

The preferred network of conduits comprises inlet and outlet headers 2, 4, respectively, which extend longitudinally of the panel at opposite sides thereof, both of which have the same internal oval cross sectional shape and size as shown in FIG. 2. Three additional longitudinally extending conduits 6, 8, 10 are positioned between and parallel to the headers 2, 4 and are co-extensive with the headers. Conduit 6 which is closely adjacent header 2 has the oval cross sectional shape shown in FIG. 5, while conduits 8 and 10 have the same internal size and oval cross sectional shape shown in FIG. 3, which is smaller than that of conduit 6. Cross conduits 12, 14 are provided at the opposite ends of the panel and connect the ends of the longitudinal conduits 4, 6, 8, 10. Header 2 is connected to conduit 6 at 16 and is therefore connected into this primary, rectangular grid.

The longitudinal conduits are interconnected by transverse conduits positioned internally of the primary rectangular grid, the arrangement and internal sizes of the transverse conduits being such that the network of conduits between the inlet end 20 of inlet conduit 2 and the outlet end 22 of the outlet conduit 4 produces the irregular flow pattern having the constant and low pressure resulting in the high efficiency which is characteristic of the panel.

Figure 4:
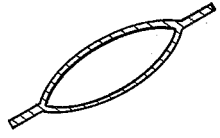

The adjacent longitudinal conduits 6, 8 are connected by a tier of transverse conduits 30, there being fifteen in this tier in the disclosed panel which has an overall length of 74 inches. Each of the conduits 30 has an angular bend midway its length and has the oval cross sectional shape and relative size shown in FIG. 3. The adjacent longitudinal conduits 8, 10 are connected by a second tier of transverse conduits 40, these being sixteen of these in this tier in the disclosed panel. These conduits are so positioned that each extends angularly to the length of the panel at a preferred angle of approximately 55° to the adjacent longitudinal conduits 8, 10 and form a series of oppositely directed triangles having their apices alternately at conduits 8 and 10. The longitudinal conduit 10 and header 4 are connected by a third tier of transverse conduits 50, there being sixteen of these in this tier of the disclosed panel. These conduits are positioned so that each extends angularly to the length of the panel at a preferred angle of approximately 55° to the adjacent longitudinal conduits 4, 10 and form a series of oppositely directed triangles having their apices alternately at header 4 and conduit 10. Transverse conduits 40 and 50 have the same relatively small cross sectional size and oval shape which is illustrated in FIG. 4.

I claim:

1. A collector panel for a solar heating system, comprising two elongated rectangular metal sheets bonded together in face-to-face relation except along elongated narrow areas defining between the sheets a network of conduits for a moving heat absorbing liquid, the network comprising two parallel conduits extending along the opposite longitudinal edges of the panel and providing inlet and outlet headers for the liquid, a plurality of parallel conduits extending longitudinally of the panel intermediate and parallel to the header conduits, and a plurality of conduits extending transversely of the panel and interconnecting the headers and the intermediate longitudinal conduits, the transverse conduits being arranged in tiers extending longitudinally of the panel between the headers and the intermediate conduits, each of the transverse conduits being disposed angularly to the headers and intermediate conduits throughout at least part of its length.

2. The collector panel according to claim 1, in which each of the transverse conduits of one of the tiers is formed with an acute angular bend between its ends.

3. The collector panel according to claim 1, in which the transverse conduits of at least one of the tiers are angularly positioned with respect to the connected longitudinal conduits and adjacent ones of these transverse conduits form adjacent triangles with their apices oppositely directed transversely of the panel.

4. The collector panel according to claim 1, in which all of the conduits are oval in cross sectional shape and those of one tier are different in cross sectional size from those of another tier.

* * * * *